Dec. 22, 1931.  E. W. ARMS  1,837,312
METHOD OF PRODUCING INSTRUMENT FRAMES
Filed July 3, 1928   3 Sheets-Sheet 1
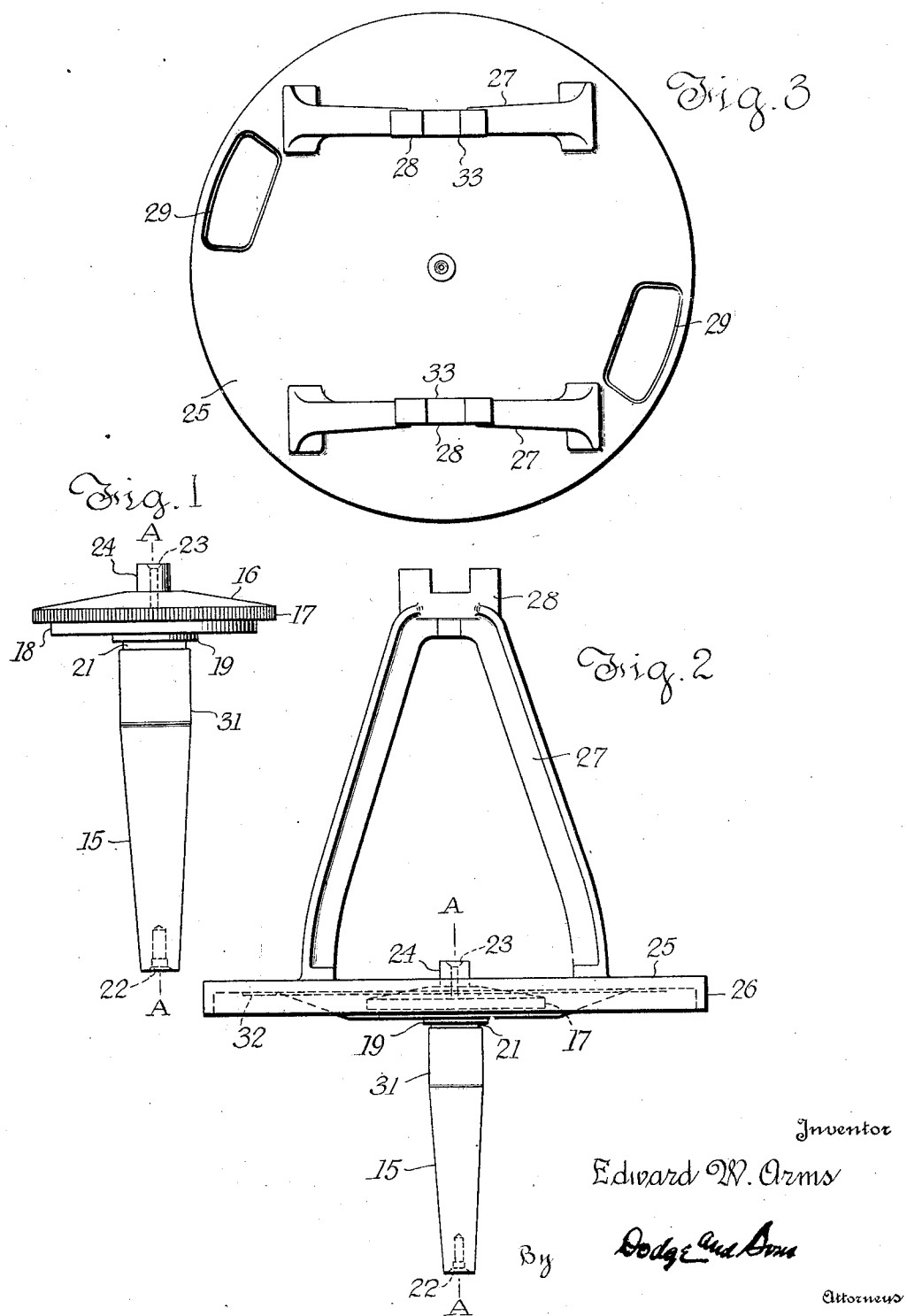

Dec. 22, 1931.    E. W. ARMS    1,837,312
METHOD OF PRODUCING INSTRUMENT FRAMES
Filed July 3, 1928    3 Sheets-Sheet 2
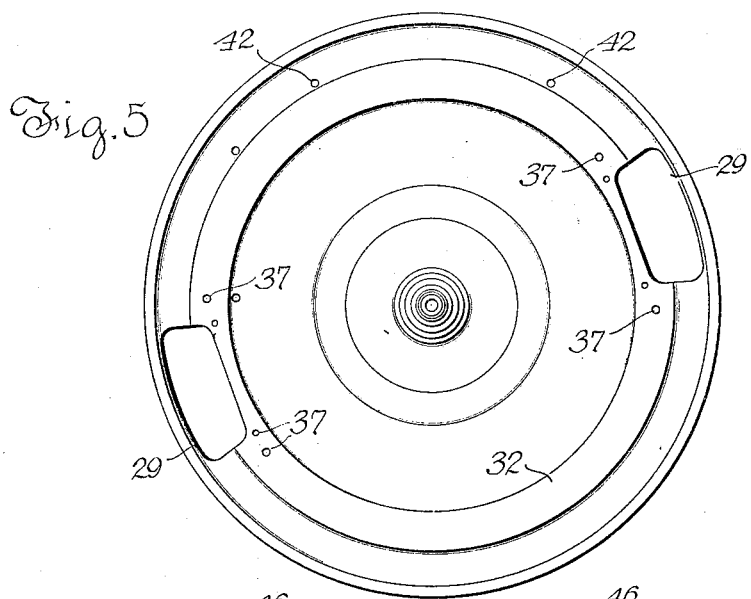
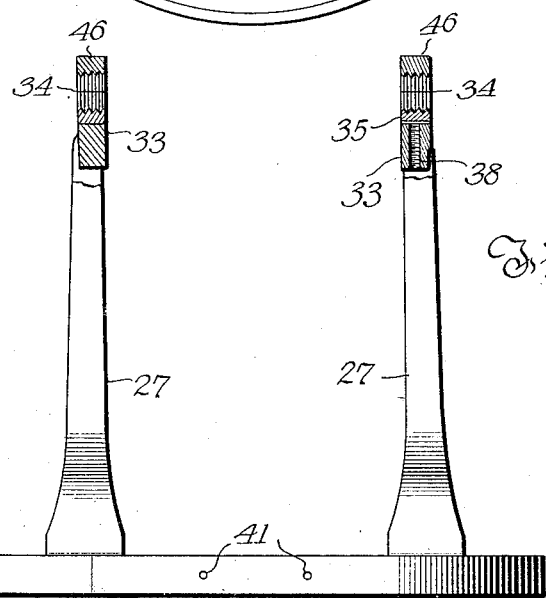
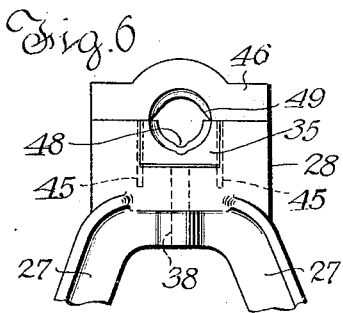
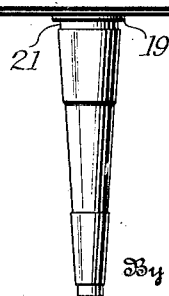
Inventor
Edward W. Arms
By Dodge and Sons
Attorneys Dec. 22, 1931.   E. W. ARMS   1,837,312
METHOD OF PRODUCING INSTRUMENT FRAMES
Filed July 3, 1928   3 Sheets-Sheet 3
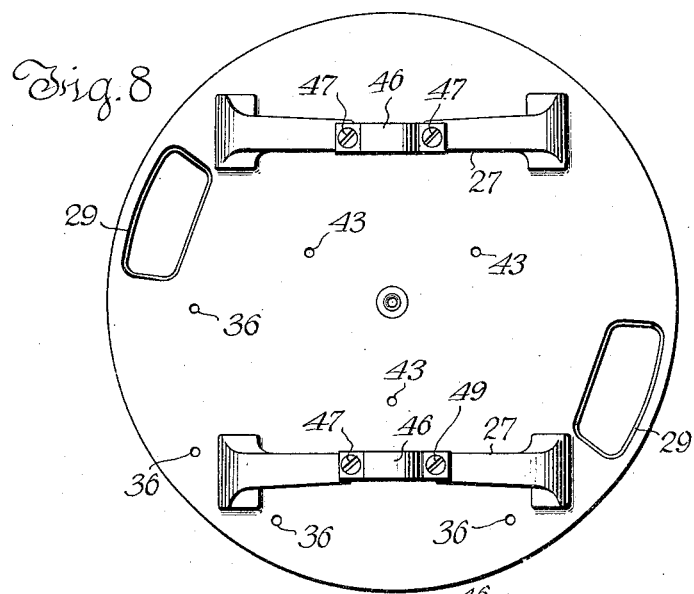
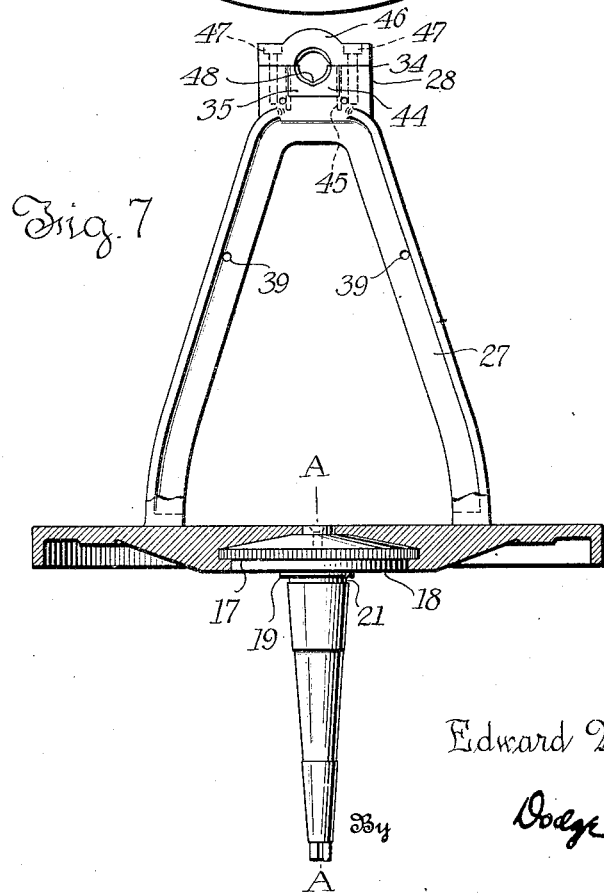
Inventor
Edward W. Arms
By Dodge and Arms
Attorneys Patented Dec. 22, 1931

1,837,312

UNITED STATES PATENT OFFICE

EDWARD W. ARMS, OF TROY, NEW YORK, ASSIGNOR TO W. & L. E. GURLEY, OF TROY, NEW YORK, A CORPORATION OF NEW YORK

METHOD OF PRODUCING INSTRUMENT FRAMES

Application filed July 3, 1928. Serial No. 290,145.

This invention relates to geometrical instruments and particularly to methods for producing frames for transits and other optical geometrical instruments having similar requirements. The resulting article is claimed in my divisional application, Serial No. 442,361, filed April 7, 1930.

Frames for such instruments ordinarily include a base plate supported on a vertical spindle for orientation and standards on said plate on which the telescope is mounted. Usually the telescope is pivotally mounted on a horizontal axis which intersects the vertical axis.

In prior constructions the spindle is a separate piece from the base plate and the standards are also a separate piece or pieces. This sectional construction has heretofore been used in precision instruments such as these, partly to permit free selection of materials, and partly to permit adjustments and hand fitting regarded by instrument makers as essential to refined accuracy.

The present invention involves a radical departure in this respect. A unitary and virtually integral structure is adopted. All adjustments save one are eliminated. Reliance is placed on the precision of machine operations. Practical interchangeability is secured. The accuracy of the instrument initially is at least equal to that of the prior art instruments, and the maintained accuracy is superior because of the absence of fitted joints with their necessarily stressed connections.

Generally stated, the desired geometrical relations of the various axes of the instrument are determined by the machining operations, all of which are referred to the axis of the vertical spindle. More particularly this is accomplished by establishing countersinks by means of which the unitary frame is supported in a machine tool on the geometrical axis of the spindle generating a surface of rotation (preferably temporary) about such axis, and thereafter positioning the piece for machining operations by engaging either the countersinks or said surface. If the locating surface be temporary, as preferred, a final operation is to mount the frame in the countersinks and machine the spindle to final form.

As above described, the invention is not limited to any particular type of unitary frame structure, but the best results now known are secured as follows:

A spindle blank with mushroom head is formed by countersinking its ends to define the fiducial axis and then turning it on centers to an accurate form in which the spindle portion alone is oversize. The material is advisably, but not necessarily, a forging of suitable aluminum alloy. This spindle blank is then mounted in a casting die of such form as to protect the oversize spindle and countersinks and accurately position the spindle blank while the base plate and standards are die cast in one piece on or around the mushroom head. By using a suitable aluminum alloy a virtually unitary piece can be secured including inserted spindle and die cast base plate, and standards, precisely formed and positioned relatively to one another.

Such a unitary frame is free of internal strains, and thus is superior in maintained accuracy to any sectional frame in which the connectors, and indeed to some degree all parts, are subject to continual stress. Moreover the frame is accurately symmetrical with reference to the axis of the insert which forms the spindle. The frame so made is machined by operations which preserve the original axis of the spindle insert as the axis of the entire frame. Thus the finished frame is symmetrical relatively to the spindle axis, and no disturbing effects incident to the use of diverse alloys occur.

In this way the original axis is preserved throughout and used in the final spindle-finishing operation. Proper design of fixtures makes it simple to ensure the accurate intersection of the spindle and trunnion axes or the spindle and telescope axes and the essential 90° relation thereof.

The above being a general outline of the invention, the preferred commercial practice will now be described with reference to the accompanying drawings, in which,—

Fig. 1 is an elevation of the spindle blank

Fig. 2 is an elevation of the casting as it comes from the die.

Fig. 3 is a plan thereof.

Fig. 4 is a side elevation of the transit frame after all machining operations except the final operation of finishing the spindle. In this view the standards shown in section through the trunnion bearings.

Fig. 5 is a view looking upward at the frame of Fig. 4.

Fig. 6 is a fragmentary view showing details of the structure of a trunnion bearing.

Fig. 7 is a vertical view, partly broken away, in axial section and showing the finished transit frame.

Fig. 8 is a plan view of the finished structure shown in Fig. 7.

A suitable blank of forged aluminum alloy is prepared, preferably a so-called "strong" aluminum alloy such as described in the patent to Archer and Jeffries, 1,472,739, granted October 30, 1923. Broadly stated the alloy is free from copper except as an impurity and contains magnesium and not less than 0.5% silicon, preferably about 1% of each of magnesium and silicon. (See the Archer and Jeffries patent, page 1, lines 29 to 35, and lines 49 to 54.) This alloy is quenched and artificially aged, as described in the patent, and is therefore in favorable condition for machining operations. It is machined to the form shown in Fig. 1. This includes an over-sized tapered spindle 15, having an enlarged head made up of a conical portion 16, a knurled or ribbed cylindrical portion 17 and a slightly smaller cylindrical portion 18 whose lower surface is to be flushed with the lower face of the base plate of the transit frame. The purpose in machining the blank is to secure a high degree of precision of form and a clean bright surface.

Various different forms might be adopted for this enlarged head, that chosen being designed to offer several angles and a roughened peripheral surface, all of which are favorable to close engagement with the die casting formed around the head.

The two parts do not fuse together, but the shrink of the die cast metal is such as to produce a bond which will stand severe abuse. For example, the joint may be struck heavy blows with a machinist hammer while the frame is supported by clamping the spindle in a vise, without showing any tendency of the joint to fail. Blows which break out pieces of the base plate do not affect the bond between the forging and the die casting.

Below the portion 18 is a boss 19 which is later finished to form the seating shoulder of the spindle. Below the boss 19 is a relief groove 21 which furnishes the necessary clearance for turning and grinding operations on the spindle.

A countersink 22 in the lower end of the spindle portion and another, 23, in a projection 24 provided especially to receive it, serve to support the spindle blank while it is turned to form.

The casting die in which the head is cast, is formed with a recess into which the portion 31 tightly fits so that the entire spindle from the lower face of portion 18 is protected. Similarly the mold has a recess which receives and closely confines the projection 24. The purpose and effect is to protect the spindle and the countersinks 22 and 23 so far as is possible from the die cast metal. The countersinks 22 and 23, of course, define the vertical axis A—A and this axis is the reference line for all machining operations.

After the blank has been placed in the die of the die-casting machine, the base plate and standards are cast thereon as a single unit, by methods for which no novelty is here claimed.

Generally stated, the alloy used for die casting is an aluminum base alloy containing as the main alloying constituent about 12% silicon. Iron is also present in small quantity but is regarded as an impurity, (see the patent to Jeffries and Archer No. 1,508,556, page 4, line 59 et seq. where the patentees state that the general class of alloys contains silicon in substantial amount, say from 3 to 15 per cent.). The alloy has, in the finished condition a tensile strength in the neighborhood of 34,000 pounds per square inch with an elongation of approximately 2½% and a Brinnell hardness number of 80.

It will be observed that the die casting operation involves an incidental heating of the forging and that the properties of the forged alloy must be such as to entail no adverse effect resulting from such heating. While the preferred alloys have been stated, considerable latitude of choice is offered within the disclosures of the alloy patents above mentioned, and best results are secured by a careful coordination such as will ensure the use of two alloys, which considering the sizes and forms of the two parts, will in cooperation produce the desired result. It is quite possible that serviceable alloys not falling within the disclosures of said two patents may be found but the two specified have developed highly desirable characteristics in practice and are preferred.

The casting as it comes from the die is illustrated in Figs. 2 and 3. The cast portions include a base plate 25 with a pendant marginal flange 26 and two pairs of standards 27, of usual form. Each pair is connected at the top by a rectangular head or enlargement 28 in which seats for the trunnion-bearing blocks of the telescope are to be machined.

The openings in the base plate, indicated at 29, are those through which the horizontal limb and its verniers are to be read. These are formed with recessed margins to receive cover glasses.

The operations of finishing the casting are as follows:

The casting is first snagged and the Vernier openings 29 are finished to size. The centers 22 and 23 are then lapped. The casting is mounted on these centers and the cylindrical portion 31 and tapered portion 15 of the spindle are turned to definite dimensions (see Fig. 2). Thereupon the transit frame is chucked in a collet which engages the portion 31 of the spindle and the top of the spindle 24 is machined off flush with the top of the plate 25; then drilled and countersunk. The under side of the plate 25 is then faced, as shown at 32 to afford a seat for the verniers. The inner side of the flange 26 is machined and the shoulder 19 is machined with reference to the Vernier seat 32.

The transit frame is next placed in a fixture (not shown) in which it is positioned by the engagement of the spindle 15 with a correspondingly shaped socket in the fixture. The frame is oriented in the fixture by lugs which engage the sides of the heads 28 in such a way that the frame as a whole is positively positioned. While so supported the two relatively opposed faces 33 of the heads 28 are machined. This operation is performed by milling and in such a way as to establish the correct interval between the two faces and secure accurate centering on the axis A—A. The top faces of the heads 28 are then milled off to the line 34, (see Figs. 4 and 7), after which the recesses to receive the bronze bearing blocks 35 are milled.

The frame is successively supported in a number of different jigs in each of which it is positioned primarily by the spindle and secondarily by engagement with heads 28, and these jigs serve to locate a number of holes, for example, the holes 36 for the level posts; the holes 37 for the vernier; the tapped hole 38 for the adjusting screw; the tapped holes 39 for the vertical circle vernier, and others, such as 41 and 42 (which have to do with certain tangent screw supports), the tapped holes 43 for the compass, and the like. It is not deemed essential to go into details as to the purpose of these several holes. The important feature of novelty here under consideration is the idea of locating the jig relatively to the casting by means of the axis spindle.

Another fixture holds the blocks 35 in position and guides the drill which bores a vertical hole at each end of each block, the hole being half in the block 35 and half in the head 28 in which the block is set. Guide pins 45 are next inserted and serve as a means for permanently positioning the bearing blocks 35. The bearing caps 46 are next inserted in a fixture, which locks them in position after which the caps are drilled and counterbored and mating holes are drilled and tapped in the blocks 28, to receive the screws 47 which retain the caps 46 in place on the blocks 28.

It will be understood that the bearing caps 46 and the blocks 35 are in the unfinished state at this time, to the extent that no bearings have been formed in them. With the frame positioned in a fixture by means of its spindle, as before, the caps 46 and blocks 35 are drilled and reamed for the trunnion bearings, and these bearings are hobbed to the form best shown in Fig. 4.

The annular grooves formed in the bearings mate with similarly grooved journals on the telescope trunnions (not shown). The trunnions thus serve as a bracing element between the two standards of the transit frame. The grooving of the trunnion journals fixes the geometrical axis of the telescope relatively to the axis A—A of the spindle, and is known practice in the art.

In the final hobbing operation a relief is cut at 48 and later portions of the bearings in the cap are relieved at 49 so that the bearing as a whole has three spaced arcs of contact with the trunnion.

Upon the completion of these operations the frame is again mounted on centers and the spindle is turned and ground to finished dimensions. The finished form is shown in Fig. 7.

It will be observed that all the machining operations are referred to the axis of the spindle, and it follows that the accuracy of the finished product is dependent solely on the operative precision of the machine tools used in its production. The frame structure is unitary with the exception of the inserted bearing blocks, and the bearing caps which are used to secure satisfactory bearing metal at these points. The only adjustment in the frame is the adjustment of one bearing block by a thrust screw working in the tapped hole 38.

Attempts have heretofore been made to use aluminum in the frames of surveying instruments to secure lightness, but these failed, first because the aluminum zinc alloy used was soft, weak and subject to spontaneous disintegration, and, second, because the sectional construction used exaggerated the inherent defects of the material.

The strong alloys used according to the present invention have physical properties far superior to those of the bronzes and brasses customarily used in surveying instruments; they do not warp as do some bronzes, they can be satisfactorily machined, and they are light in weight. The unitary construction and heat treatment produce a frame relieved of all internal stresses, such as are inevitably present in sectional frames. The method of machining ensures precise accuracy, ensures symmetry of the cast portion relatively to the forged insert, and permits the elimination of various adjustments formerly necessary to correct errors inherent in any sectional construction. The result is strength, simplicity, lightness and maintained accuracy in a degree never before approached. As suggested considerable latitude in the choice of metals and their treatment is possible. The patents referred to in the specification will serve as a useful guide in meeting particular requirements when aluminum alloys are to be used.

What is claimed is,—

1. The method of producing frames for surveying and like geometrical instruments, which consists in constructing a frame having a spindle, machining said spindle while supported on centers which define the geometrical axis to produce a temporary oversized surface, supporting the frame by engaging said temporary oversized surface of the spindle, and while so supported performing on the frame machining operations which define related geometrical axes, and then supporting said frame on the first named centers, and finishing said spindle to its final form.

2. The method of producing frames for surveying and the like geometrical instruments, which consists in supporting a spindle blank on centers which define its geometrical axis, and machining a head thereon, then permanently affixing to said head a unitary frame for the instrument, then mounting said spindle on the original centers and machining the spindle to impart an accurate temporary surface, then supporting said spindle by engagement with said temporary surface, and while so supported machining the frame to define other geometrical axes of the instrument in proper relation to the spindle axis, and finally mounting said frame on the original centers and machining said spindle to finished form and size.

3. The method of producing frames for surveying and like geometrical instruments, which consists in producing by forging and die-casting operations, a frame blank having a forged spindle and a die-cast head permanently connected with each other, establishing the geometrical axis of the spindle by means of centers, and thereafter referring machining operations on said frame to such geometrical axis, the operations on the spindle being performed while the frame is supported on said centers, and other operations on the frame being performed while the latter is sustained and positioned by a solid of revolution generated by machining the spindle while supported on said centers.

4. The method of producing frames for surveying and like geometrical instruments, which consists in producing a unitary frame structure having a spindle, establishing centers which define the geometrical axis of said spindle, and thereafter referring machining operations on said frame to said axis, the machining operations on the spindle being performed while the frame is supported on said centers, and other machining operations on the frame being performed while the frame is supported by surfaces so generated on the spindle.

5. The method of producing a composite frame for surveying and like geometrical instruments, which consists in preparing a forged blank, establishing centers to define the geometrical axis of said blank, turning said blank on said centers to produce an oversized spindle and a supporting head, mounting said partly finished spindle in a die and casting on said enlarged head the remaining portion of the frame structure, then supporting the frame structure on the original geometrical axis by means of said centers, and accurately forming on said spindle a temporary surface, positioning said frame by engagement with said temporary surface and while so positioned performing on said frame machining operations which define at least one related geometrical axis of the instrument, and then supporting said frame on the original centers and machining said spindle to finished size and form.

6. The method of producing frames for surveying and like geometrical instruments, which consists in constructing a substantially unitary frame including base plate, telescope standards and a forged spindle whose axis is defined by countersinks, machining said spindle while supported in centers engaging said countersinks to produce an oversized temporary surface on the spindle, positioning said frame by means of said oversized surface and while so positioned performing on said frame, machining operations which define surfaces in definite geometrical relation to the axis of said spindle, and finally supporting said frame on centers engaging said countersinks and machining said spindle to finished form.

7. The method of producing frames for surveying and like geometrical instruments, which consists in forming a substantially unitary frame including base plate, telescope standards and a spindle whose axis is defined by countersinks, at least a portion of said frame being of forged metal, machining said spindle while supported in centers engaging said countersinks to produce an oversized temporary surface on said spindle, positioning said frame by means of said oversized surface and while so positioned performing on said frame machining operations which define surfaces in definite geometrical relation to the axis of said spindle, and finally supporting said frame on centers engaging said countersinks, and machining said spindle to finished form.

8. The method of producing frames for surveying and like geometrical instruments including a plurality of geometrically related axes, which consists in forming a substantially unitary blank, including a base plate, spindle and standards, permanently establishing the geometrical axis of said spindle, and thereafter referring to the axis so established machining operations on the standards which serve to define a related axis.

9. The method of producing frames for surveying and like geometrical instruments including a plurality of geometrically related axes, which consists in forming a substantially unitary blank, including a base plate, spindle and standards, the spindle and at least a portion of the base plate being of forged metal, permanently establishing the geometrical axis of said spindle, and thereafter referring to the axis so established machining operations on the standards which serve to define a related axis.

10. The method of producing instrument frames of the type including a vertical axis and a horizontal axis, which consists in forming a blank including a spindle, establishing the geometrical axis of said spindle as the vertical axis of said frame by means of centers; and thereafter referring all machining operations which define said horizontal axis to the vertical axis so established.

In testimony whereof I have signed my name to this specification.

EDWARD W. ARMS.